United States Patent [19]
Cornfield et al.

[11] Patent Number: 6,118,794
[45] Date of Patent: Sep. 12, 2000

[54] DIGITAL SIGNAL PROCESSING APPARATUS FOR FREQUENCY DEMULTIPLEXING OR MULTIPLEXING

[75] Inventors: Paul Simon Cornfield, Welwyn Garden City; Alexander Walker Wishart, London, both of United Kingdom

[73] Assignee: Matra Marconi Space UK, Ltd., Stanmore, United Kingdom

[21] Appl. No.: 08/931,478

[22] Filed: Sep. 16, 1997

[30] Foreign Application Priority Data

Sep. 19, 1996 [GB] United Kingdom ............... 9619537

[51] Int. Cl.[7] .................................................. H04J 1/02
[52] U.S. Cl. ................................. 370/497; 370/210
[58] Field of Search .................... 370/480, 488, 370/497, 542, 290, 291, 281, 210

[56] References Cited

U.S. PATENT DOCUMENTS

| | | | |
|---|---|---|---|
| 4,138,730 | 2/1979 | Ali | 708/404 |
| 4,777,634 | 10/1988 | Burger et al. | 370/505 |
| 5,247,515 | 9/1993 | White | 370/487 |
| 5,870,395 | 2/1999 | Baran | 370/395 |

FOREIGN PATENT DOCUMENTS

0695054  1/1996  European Pat. Off. .

*Primary Examiner*—Hassan Kizou
*Assistant Examiner*—Daniel Previl
*Attorney, Agent, or Firm*—Donald C. Casey, Esq.

[57] ABSTRACT

Digital signal processing apparatus for frequency demultiplexing a wide band channel which converts the data stream into parallel branches by means of serial-to-parallel conversion, and demultiplexing which consists of low pass and high pass fine filtering stages and a coarse filtering stage split among processors across parallel branches. Wideband signals are processed without expensive processors because of the slower rate in the parallel channels. This may also be used for the inverse function of multiplexing.

16 Claims, 8 Drawing Sheets

FILTER SHAPE FIG. 7a

CHARACTERISTIC FILTER COEFFICIENTS FIG. 7b

FILTER SHAPE FIG. 8a

CHARACTERSTIC FILTER COEFFICIENTS FIG. 8b

FILTER SHAPE

FIG. 9a

FILTER COEFFICIENTS

FIG. 9b

FILTER DECOMPOSITION

DIGITAL SIGNAL PROCESSING APPARATUS FOR FREQUENCY DEMULTIPLEXING OR MULTIPLEXING

BACKGROUND OF THE INVENTION

1. Field of the Invention

This invention relates to digital signal processing apparatus for frequency demultiplexing or multiplexing.

2. Description of the Prior Art

The invention especially relates to such processing apparatus for use on-board a satellite. Typically, such a satellite will have receiving beams and transmitting beams. The on-board processor may demultiplex the received uplink channel them to different downlink channels where desired, multiplex the sub-bands of the respective downlink channels, change the frequency of the downlink channels, amplify the channels, that the downlink beams may be transmitted.

In the case of wideband channels, which are typically hundreds of Megahertz (MHz) in bandwidth, there are standard widths of sub-band into which the channel can be divided, for example, 36, 72, 108 MHz. Current analogue multiplexers or demultiplexers accordingly have filters appropriate to these bandwidths which are switched in remotely from the ground as required.

A problem with such an analogue implementation is the weight and volume occupied by the filters and switches, and digital schemes have been considered to overcome this.

The Applicants have previously proposed a digital signal processing apparatus for multiplexing or demultiplexing a narrowband channel, typically 4 MHz, with sub-bands typically 36 KHz in width (EP-A-0 695 054).

Figure 2:
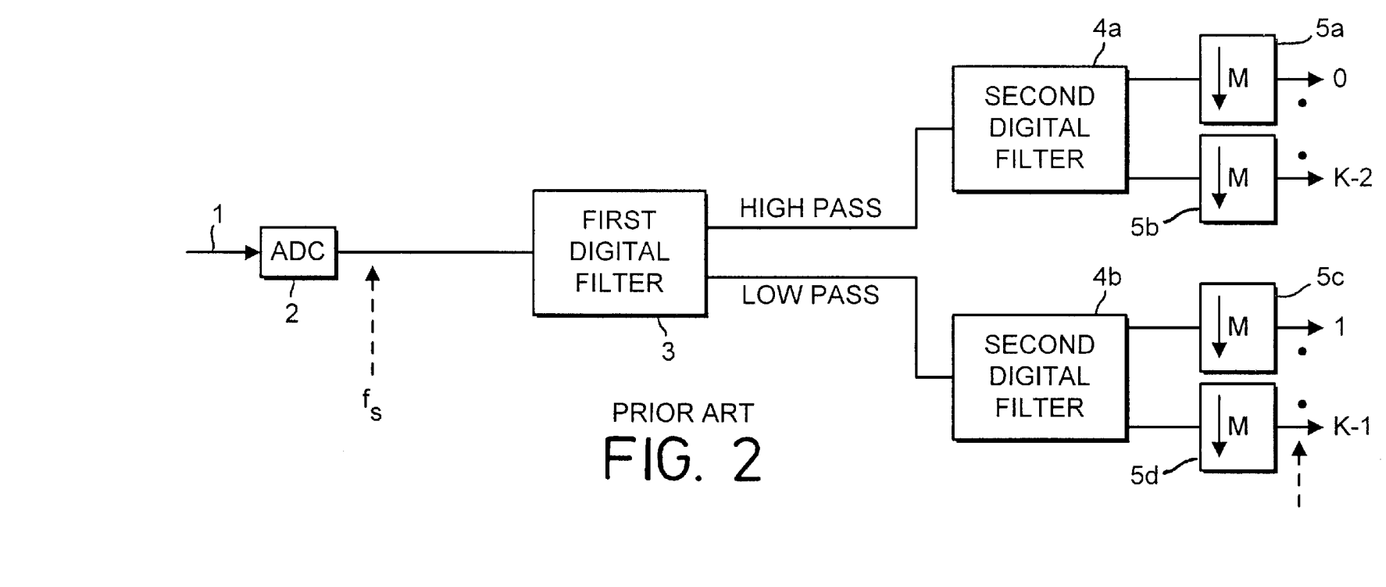
FIG. 2 is a conceptual representation of a known digital signal processing apparatus for frequency demultiplexing a narrowband input frequency division multiplex (FDM) of K channels.

FIG. 2 shows the general scheme of the demultiplexer. The sub-bands are isolated by means of a polyphase filter and linked FFT units 4a, 4b, which perform a relatively coarse filtering operation.

Figure 3A:
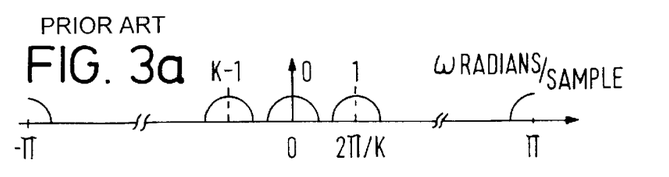
FIG. 3a is a spectrum of a typical complex FDM for input to the digital signal processing apparatus of FIG. 2.
Figure 3B:
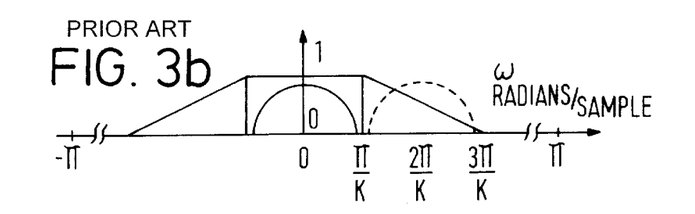

The frequency response of the polyphase filter/FFT for extracting sub-band 0 is shown in FIG. 3b. The pass band is centered on the desired channel, but the transition bands are relatively relaxed and actually extend over the adjacent sub-band on each side. The units 4a, 4b have a similar frequency response centered on each sub-band K-1, 0, 1 etc of the narrowband input channel, which is a complex FDM (frequency division multiplex) of K-channels (FIG. 3a).

The relaxed transition bands reduce the complexity of the polyphase filter/FFT implementation, and hence reduce its cost.

Figure 3C:
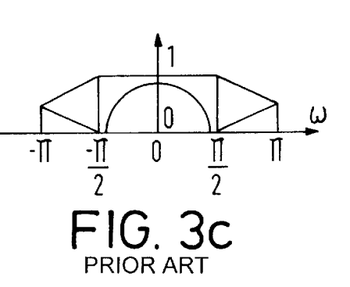
FIG. 3c is the spectral response of FIG. 3b after decimation by K/2.

Multiplexers/demultiplexers proposed before EP-A-0 695 054 overcame the problem of the relaxed transition bands by using a bank of fine (i.e. tight) digital filters on each sub-band extracted by the units 4a, 4b. However, this still left the problem that the relaxed transition bands restricted the amount by which each sub-band could be decimated in the polyphase filter/FFT. The maximum possible decimation was by K/2 (K being the number of sub-bands), as shown in FIG. 3c. Further decimation would alias the transition bands, which contain signal energy from adjacent channels, into the passband.

Figure 3D:
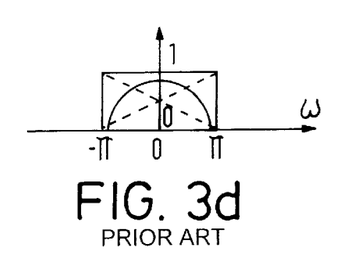
FIG. 3d is the spectral response of FIG. 3b after decimation by K.
Figure 3E:
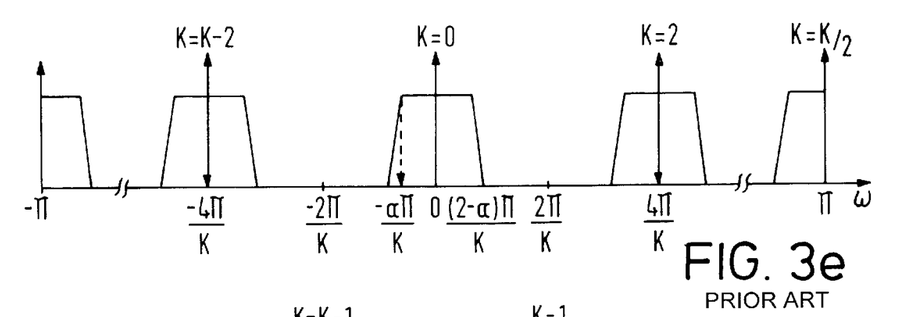
Figure 3F:
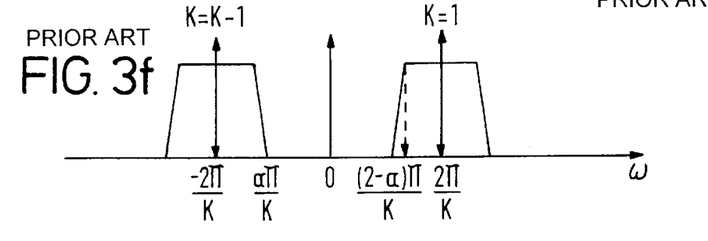

In EP-A-0 695 054, the Applicants proposed replacing the bank of fine filters by a block fine filtering stage before the coarse filtering stage. The first digital filter 3 consisted of an imaged low pass (for example half band) digital filter (producing an output as shown in FIG. 3e) and an imaged high pass (for example, half band) digital filter (producing an output as shown in FIG. 3f). This was obtained by using a digital filter such as an FIR filter having the desired tight (prototype) filter shape, say, that centered on sub-band k=0, and then padding the impulse response with zero coefficients to produce multiple images of that tight filter shape. The alternate frequency slots for the low pass case are nulled out (FIG. 3e). So are those for the high pass case (FIG. 3f). Each low and high pass prototype impulse response are each padded with (K/2−1) zeros between each coefficient to produce K/2 images of the prototype filter each.

When the block fine low and high pass filtering stage 3 precedes the block coarse processing stage (in fact stages, since a polyphase filter/FFT unit is provided for the output of each of the block low and high pass filters), the transition bands (FIG. 3b) now lie in the nulled out regions of the spectrum. Not only is the bank of fine filters unnecessary, but now the maximum possible decimation of K can be performed in each of the two polyphase filter/FFT units 4a, 4b, as shown in FIG. 3d. The transition bands of adjacent sub-bands are now wholly aliased with each sub-band, but this does not matter since they do not contain any energy.

SUMMARY OF THE INVENTION

The Applicants contemplated adapting their previous proposal of FIG. 2 to a wideband channel, by using devices with sampling rates in the Gigasamples per second (Gsps) range, but there are severe constraints on digital ASICs as to the rate at which data can be processed.

The invention provides a digital signal processing apparatus for frequency demultiplexing a wideband channel into equally spaced sub-bands, comprising a fine filtering stage which includes low pass digital filter means and high pass digital filter means, each being arranged to null out alternate frequency slots leaving only even numbered and odd numbered sub-bands, and a coarse filtering stage connected to the output of the fine filtering stage which includes digital filter means for isolating the even numbered sub-bands and the odd numbered sub-bands, wherein there is provided a serial-to-parallel converter having an input for wide band signal samples and outputs for a plurality of sub-sampled signals, and wherein the low pass filter means and the high pass filter means each comprise a respective filter in each parallel branch.

The invention also provides a digital signal processing apparatus for frequency multiplexing a plurality of sub-bands into a wide band channel comprising a block coarse filtering stage which includes digital filter means for combining even numbered sub-bands, and for combining odd numbered sub-bands, and a fine filtering stage connected to the output of the coarse filtering stage, which fine filtering stage includes low pass digital filter means and high pass digital filter means, each arranged to null out alternate frequency slots leaving only the even numbered sub-bands and the odd numbered sub-bands, wherein there is provided a parallel-to-serial converter having an input for the sub-band signal samples and an output for the wideband signal samples, and wherein the low pass filter means and the high pass filter means each comprise a respective filter in each parallel branch.

The implementation using separate low pass and high pass filters in each parallel branch permits the use of slower, cheaper processors e.g. CMOS of lower power even though the overall data rate can be chosen to correspond to a wideband channel. Even though each individual low pass and high pass filter in each branch only processes separated, not consecutive wideband signal samples, it turns out that the same output samples are produced by the individual low pass and high filters in the branches after the signals in the branches have been recombined as for the block low pass and block high pass filter of EP-A-0 695 054 since zeros in the impulse response also mean that adjacent samples are not combined together to produce the successive output samples.

Digital signal processing apparatus for frequency demultiplexing and frequency multiplexing a wideband channel for use on-board a satellite, constructed in accordance with the invention, will now be described by way of example with reference to the accompanying drawings, in which:

BRIEF DESCRIPTION OF THE DRAWINGS

FIG. 3b is the spectral response, corresponding to one sub-band, of a polyphase/FFT filter of the digital signal processing apparatus of FIG. 2 for the input spectrum shown in FIG. 3a;

FIG. 3e shows the frequency response of the low pass output of fine filtering stage 3 for the input spectrum shown in FIG. 3a;

FIG. 3f shows the frequency response of the high pass output of fine filtering stage 3 for the input spectrum shown in FIG. 3a;

FIG. 4b is the spectral response, corresponding to one sub-band of a polyphase/FFT filter, for the input spectrum shown in FIG. 4a;

FIG. 4c shows the frequency response of the low pass output of fine filtering stage 3 for the input spectrum shown in FIG. 4a;

FIG. 4d shows the frequency response of the high pass output of fine filtering stage 3 for the input spectrum shown in FIG. 4a;

DETAILED DESCRIPTION OF THE INVENTION

Figure 1:
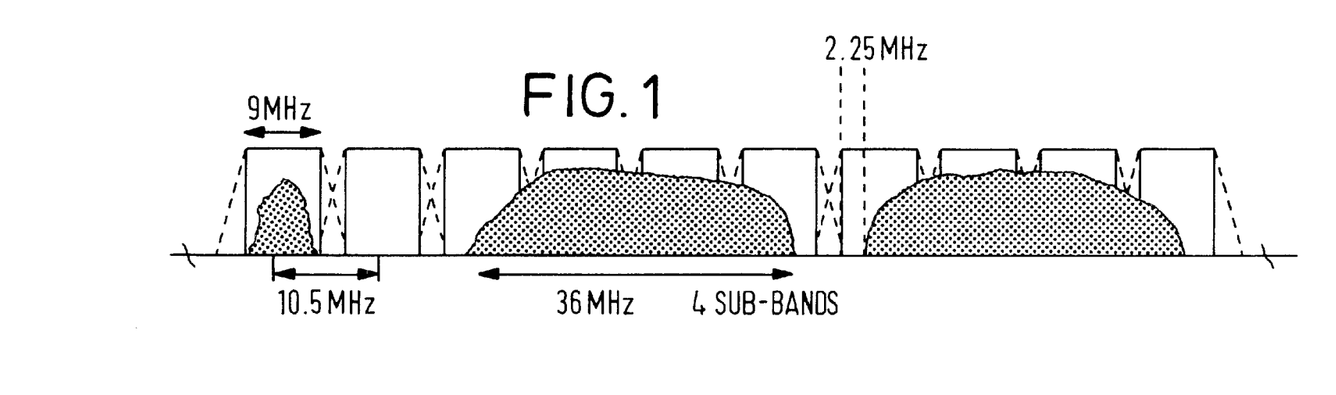
FIG. 1 illustrates schematically part of a wideband signal channel.

The satellite on board which both forms of digital signal processing apparatus according to the invention may be used may have two uplink beams and two downlink beams, each being wideband, for example, (of the order of 250–500 MHz) bandwidth. A portion of the spectrum of a beam processed in accordance with the invention is shown in FIG. 1. The full spectrum of the channel could extend, say, from 11.5 GHz to 12 GHz for the uplink and 10.5 GHz to 11 GHz for the downlink. In accordance with industry standards, the spectrum is allocated in blocks of 36 MHz as shown, or 72 or 108 MHz. In prior analogue processors, the channel would be demultiplexed into frequency slots of these widths, amplified, switched between beams if desired, multiplexed and transmitted. Prior analogue multiplexers/demultiplexers would require dedicated filters for 36 MHz, 72 MHz and 108 MHz, to be switched from the ground. It will be noted that with the digital processor of the invention, the 36 MHz band is made up using four 9 MHz slots, and the whole of the 250–500 MHz bandwidth is defined using 9 MHz slots spaced at 10.5 MHz spacing. The demultiplexing/multiplexing is contiguous i.e. a relatively wideband channel in the FDM is processed in the form of the constituent sub-bands which span the bandwidth occupied by the channel. The digital processing therefore gives greater flexibility in addition to the advantage of dispensing with bulky analogue filters.

Referring to FIG. 2, it will be remembered that the known demultiplexer consists of an analogue-to-digital converter (ADC) 2 which digitises a narrowband channel at IF frequency at sampling rate $f_s$. One of the problems encountered in attempting to increase the sampling rate substantially, is that the demultiplexer incorporates a digital anti-aliasing filter. This performs a processing operation on successive groups of consecutive samples produced by the analogue-to-digital converter 2 before they are fed to the first digital filter 3 (the digital anti-aliasing filter is not shown in FIG. 2 or EP-A-0 695 054). The spectrum of the sampled signals in FIG. 2 or EP-A-0 695 054 extends over a certain bandwidth of frequencies, both positive and negative. To facilitate processing by reducing the bandwidth and hence the sampling rate, it is usual to excise the energy in the negative frequencies. The spectrum of the resulting (real) FDM is then as shown in FIG. 3a, and the corresponding spectral diagrams of FIGS. 3b to 3f. It will be noted from FIG. 3a that there are K channels, spaced by $2\pi/K$.

In fact, the prior proposal of FIG. 2 or EP-A-0 695 054 could operate without the anti-aliasing filter. In this case the frequency spectrum of the samples leaving the analogue-to-digital converter would be as in FIG. 4a (a complex FDM), in which the bandwidth is now twice as large and in which each channel is accompanied by a complex conjugate. There are K channels, spaced by $\pi/K$, and a corresponding set of K conjugate channels, also spaced by $\pi/K$.

Equally, while the invention is described in a form without an anti-aliasing filter and with reference to the resulting spectra of FIGS. 4a to 4d, it is also applicable to the situation in which an anti-aliasing filter is used, either for example analogue, or digital while accepting that the processing necessary brings certain restrictions.

Figure 4A:
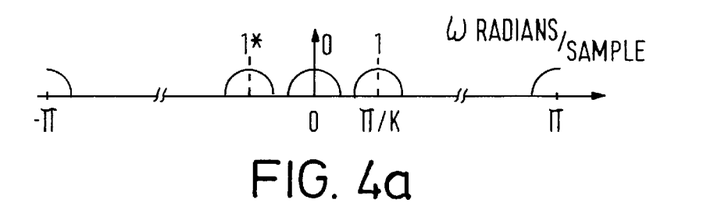
FIG. 4a is a spectrum of a typical real FDM for input to the digital signal processing apparatus of FIG. 2.

The invention can be best understood by considering the known demultiplexer of FIG. 2 with a real FDM such as is illustrated in FIG. 4a i.e. without an anti-aliasing filter.

Figure 4B:
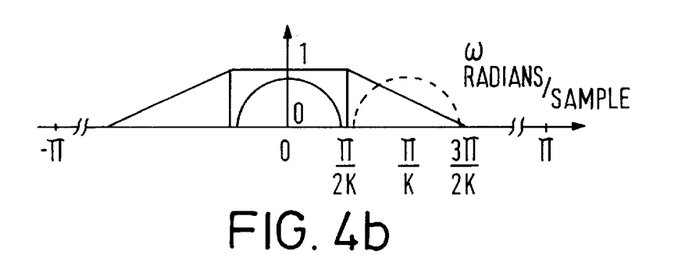
Figure 4C:
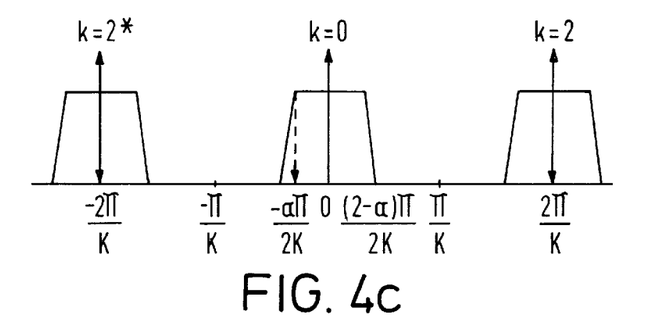
Figure 4D:
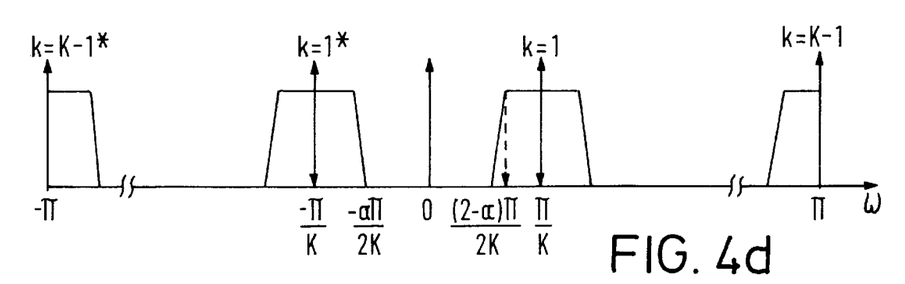

For the real FDM shown in FIG. 4a, the second (coarse) block filtering stage 4a, 4b, extracts the K channels with a frequency response with relaxed transition bands (FIG. 4b). This is preceded by a first (fine) block filtering stage 3,which has a low pass characteristic to produce the response at FIG. 4c and a high pass characteristic to produce the response of FIG. 4d. Each unit 4a, 4b is connected to one of the low pass, high pass outputs of the block fine filtering stage. Each unit is a linked polyphase/FFT processor.

For the real FDM shown in FIG. 4a, the impulse responses of the FIR low pass, high pass filters 3 are respectively padded with zeros (K−1) to produce K even numbered and K odd numbered images of the basic, tight, frequency response (the prototype) of which the images are copies. The transition bands of the units 4a, 4b lie in the nulled out regions of the spectrum between the images in the low and high pass filters. The individually extracted outputs from the units 4a, 4b can be decimated by the maximum amount of 2K as shown schematically by boxes 5a–5d, although this operation actually takes place in the polyphase/FFT filter.

Figure 5:
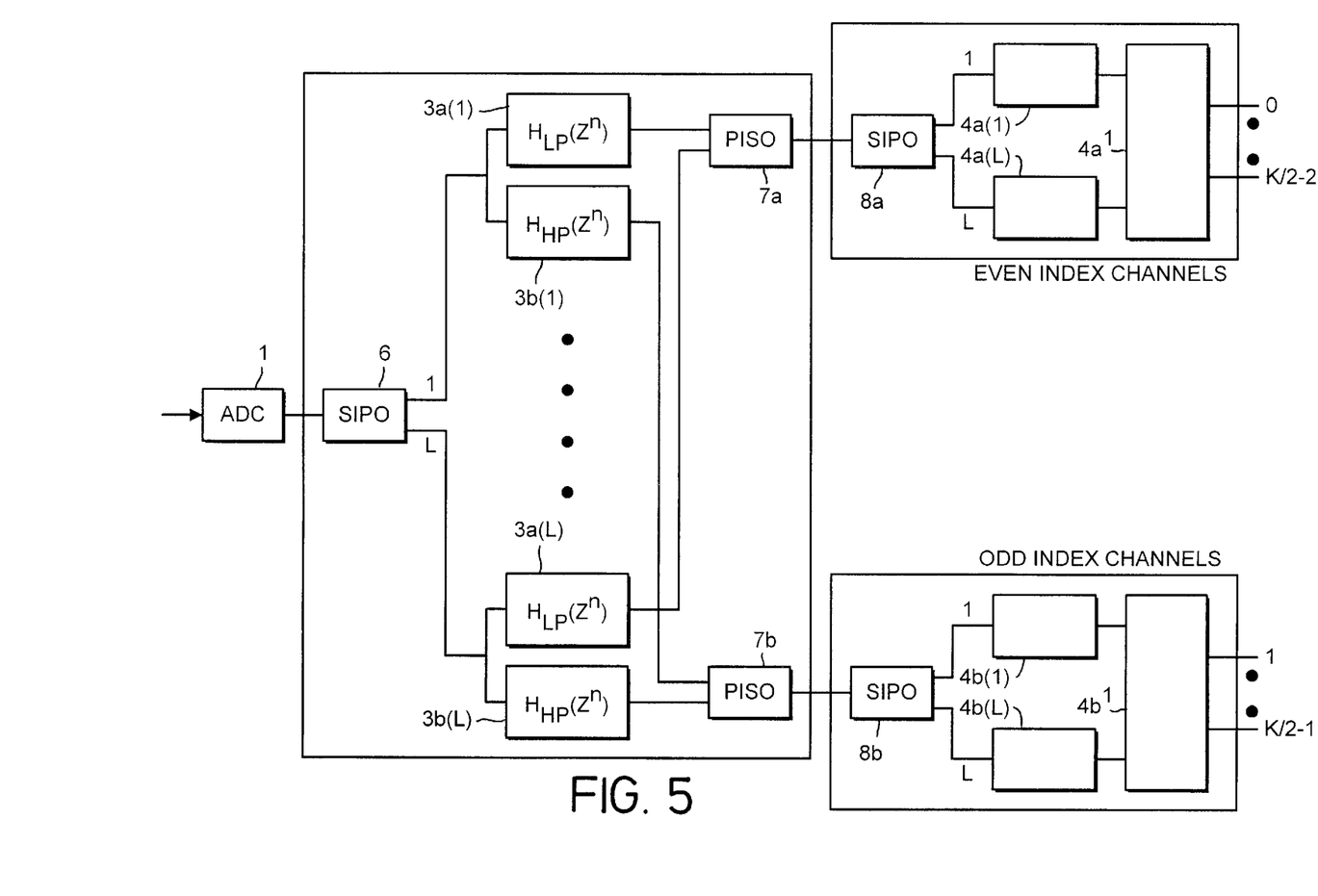
FIG. 5 is a conceptual representation of a first form of digital signal processing apparatus in accordance with the invention for frequency demultiplexing a wideband channel into K sub-bands.

Referring to FIG. 5, which is a conceptual representation of the first form of digital signal processing apparatus in accordance with the invention, it turns out that the block high pass filter and block low pass digital filter of FIG. 2 can be replaced by individual low $3a(1-L)$ and high pass $3b(1-L)$ filters in parallel branches which are fed cyclically with samples (SIPO 6) and from which the processed samples are cyclically combined (PISO 7a, 7b).

There is no decimation in the low pass and high pass FIR filters 3 of FIG. 2. For each input sample, a complete convolution is carried out and a single output sample is generated for input to unit 4a and another generated for input to unit 4b.

When the same samples are input to SIPO 6 in FIG. 5, the same output samples are fed to SIPO 8a and SIPO 8b as would have been generated by the block fine filter 3 of FIG. 2.

A simple example with reference to FIGS. 7a, 7b, 8a, 8b, 9a, 9b will show why this is so.

For simplicity only demultiplexing operations are described in detail but all functions work equally well in reverse.

Figure 7A:
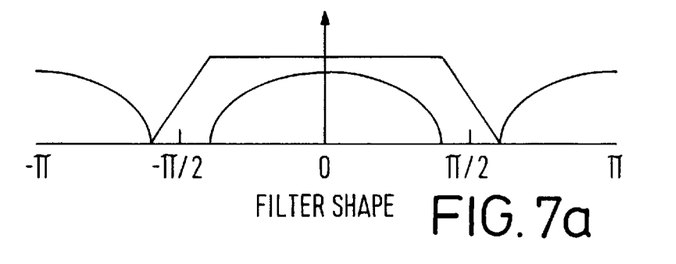
FIG. 7a shows the filter shape of a prototype low pass filter.

The imaged tight filter function 3 is used to pre-process data prior to demultiplexing or post-process data following multiplexing. The design is based around a prototype low pass filter which would be suitable for extracting a single slot centred at DC from an FDM of two slots as shown in FIG. 7a.

This is a half band filter as it is symmetric about the normalised frequency position of π/2. This also means that the filter is contiguous.

Figure 7B:
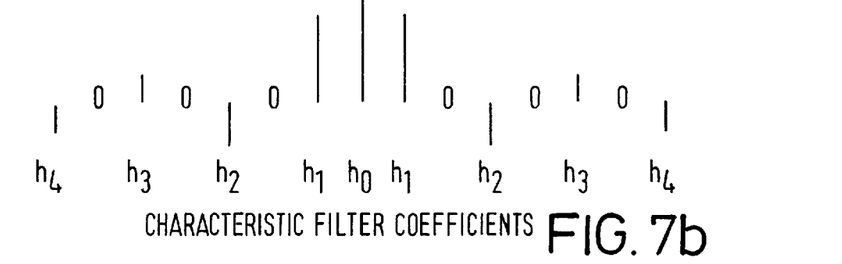
FIG. 7b shows corresponding filter coefficients.

The characteristics of the filter coefficients for such a half band filter are shown in FIG. 7b. Hence the filter taps are also symmetric with alternate zero taps except for a large centre tap. The filter length is commonly described in terms of the parameter J which is the number of distinct taps excluding the centre tap. Hence, the overall filter length is described by the equation $$N=4J-1$$

Figure 8A:
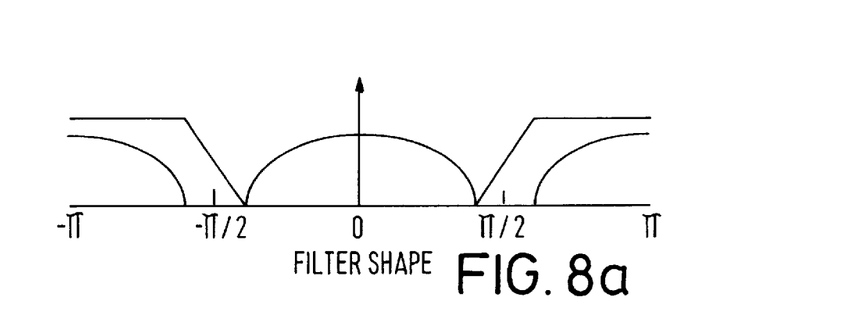
FIG. 8a shows the filter shape of a prototype high pass filter.
Figure 8B:
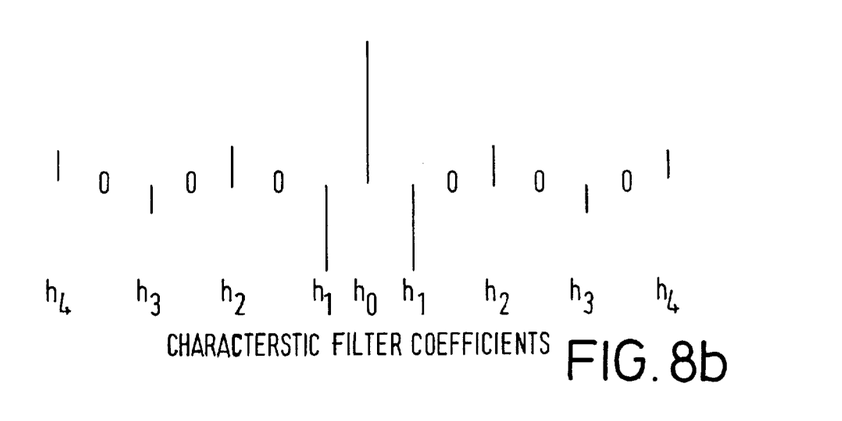
FIG. 8b shows corresponding filter coefficients.

The prototype low pass filter can be simply converted into a high pass filter as shown in FIG. 8a. The only change to the filter coefficients is the negation of all the taps except the centre tap. The same filter can therefore be used to generate both the low and high pass versions of a signal using identical partial products. It is merely the final summation that determines which band is generated.

Figure 9A:
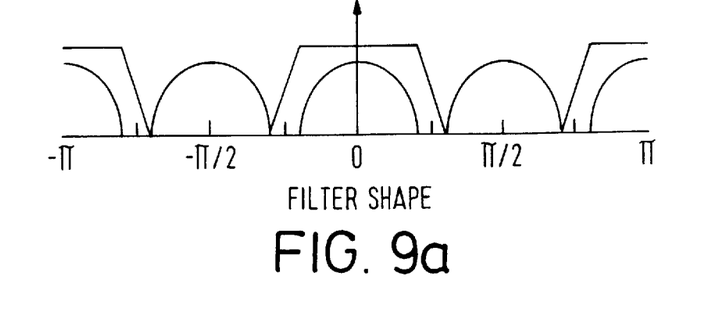
FIG. 9a shows the filter shape of an imaged low pass filter.

The process of imaging the prototype filter is to insert zeros between the prototype taps. For the filter to be imaged M times, M−1 zeros must be inserted. FIG. 9a shows the low pass filter imaged by a factor of two. This filter is now suitable for extracting two slots from an FDM of four and, in general, the imaging factor will be equal to half the number of slots within the FDM.

The imaged high pass version can again be derived from the equivalent low pass version by subtracting the centre tap instead of adding it. The resultant filter would now be suitable for extracting the other two slots from a four slot FDM.

For each input sample, a complete convolution is carried out and a single output generated for the low pass filtered version and the high pass filtered version. The process of imaging, however, is achieved by inserting zeros between each of the filter taps. Each input sample is therefore only multiplied by a non-zero filter tap at most once for M input samples.

Figure 9B:
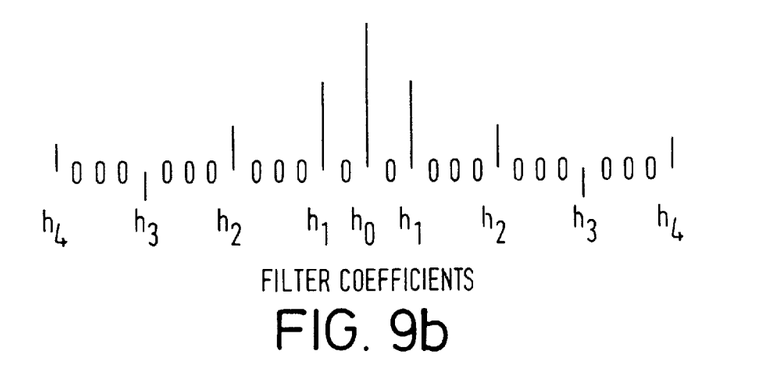
FIG. 9b shows corresponding filter coefficients.

This can be seen for FIG. 9b where the prototype filter is interpolated by a factor of 2. A sample entering the filter is multiplied by the first filter tap. It is only after four more input samples are loaded before the data is used again, all the taps between being zero. When the data reaches the centre of the filter, the frequency of non-zero taps increases so that the sample is needed on every other output sample.

As there is a separation of M samples between the times when each sample is needed, a contiguous sequence of M data values will never be convolved to form an output sample. Each sample within the block can therefore be considered to be operated upon by a completely distinct filter. This filter will be the prototype low pass or high pass by which the imaged filter was generated.

Figure 10:
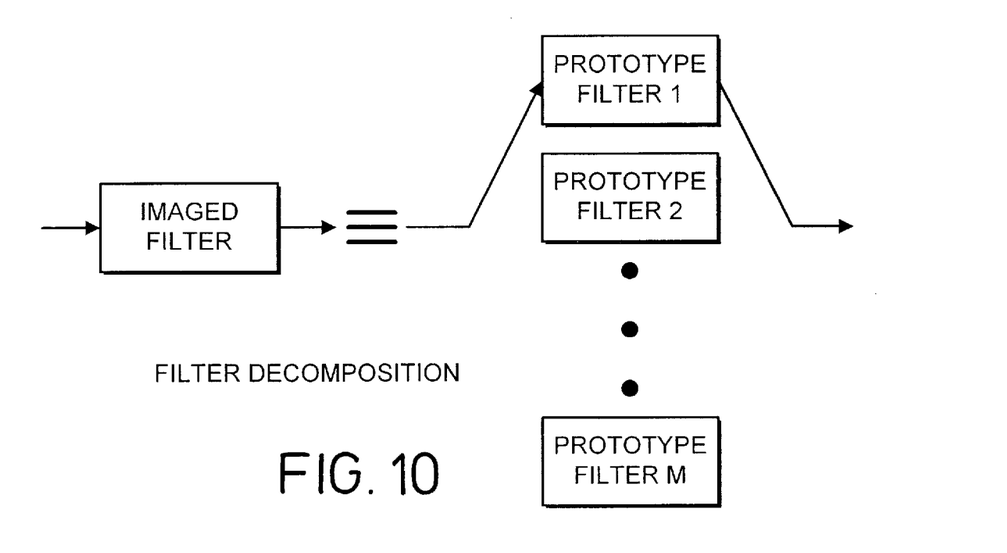
FIG. 10 shows the equivalence of the imaged filter and the multiple prototype filters.

An alternative structure to using a single imaged tight filter is therefore to explicitly use multiple versions of the prototype. Each filter would accept a sub-sampled version of the input sequence and the output from each would correspond to a sub-sampled version of the output if a single imaged device had been used. This arrangement is shown in FIG. 10 and gives the maximum parallelisation possible using an imaged tight filter. Thus M branches are used where M is equal to half the number of slots within the FDM to be demultiplexed.

Complete parallelism is not necessary for the imaged tight filter. It could for example be split into only M/2 branches, each branch performing an imaged filter based on only a four our channel FDM. The conditions on splitting the fully imaged version are given by equation 2.1:

$$M=nL \tag{2.1}$$

Where n is an integer.

Irrespective of the level of parallelism chosen for the imaged filtering operation, the total number of multiplication and addition operations remain the same. Each device within a chain, however, will require its own copy of the filter coefficients although this number is relatively small.

Reference is again made to FIG. 5, which shows a conceptual representation of the first form of digital signal processing apparatus for frequency demultiplexing a wideband channel into K-sub-bands.

Thus, ADC 1 feeds a serial-to-parallel converter 6. The first sample from ADC 1 goes to branch 1, the second to branch 2, the Lth to branch L, and the L+1th to branch 1. The first digital filter 3 is implemented as pairs of filters 3a(1), 3b(1) to 3a(L,), 3b(L). The parts 3a correspond to the output3 of FIG. 2 which produced the low pass response of FIG. 3a, and the parts 3b correspond to the output 3 of FIG. 2 which produced the high pass response of FIG. 3f. The low pass outputs are converted into a serial data stream in parallel-to-serial converter 7a, and likewise the high pass outputs in parallel-to-serial converter 7b (corresponding to the outputs of the first digital filter 3 which pass to 4a and 4b respectively).

In turn, second digital filter 4a, 4b are each implemented by processors 4a(1) to 4a(L) and 4b(1) to 4b(L) in parallel branches, fed by serial-to-parallel converters 8a, 8b.

Figure 6:
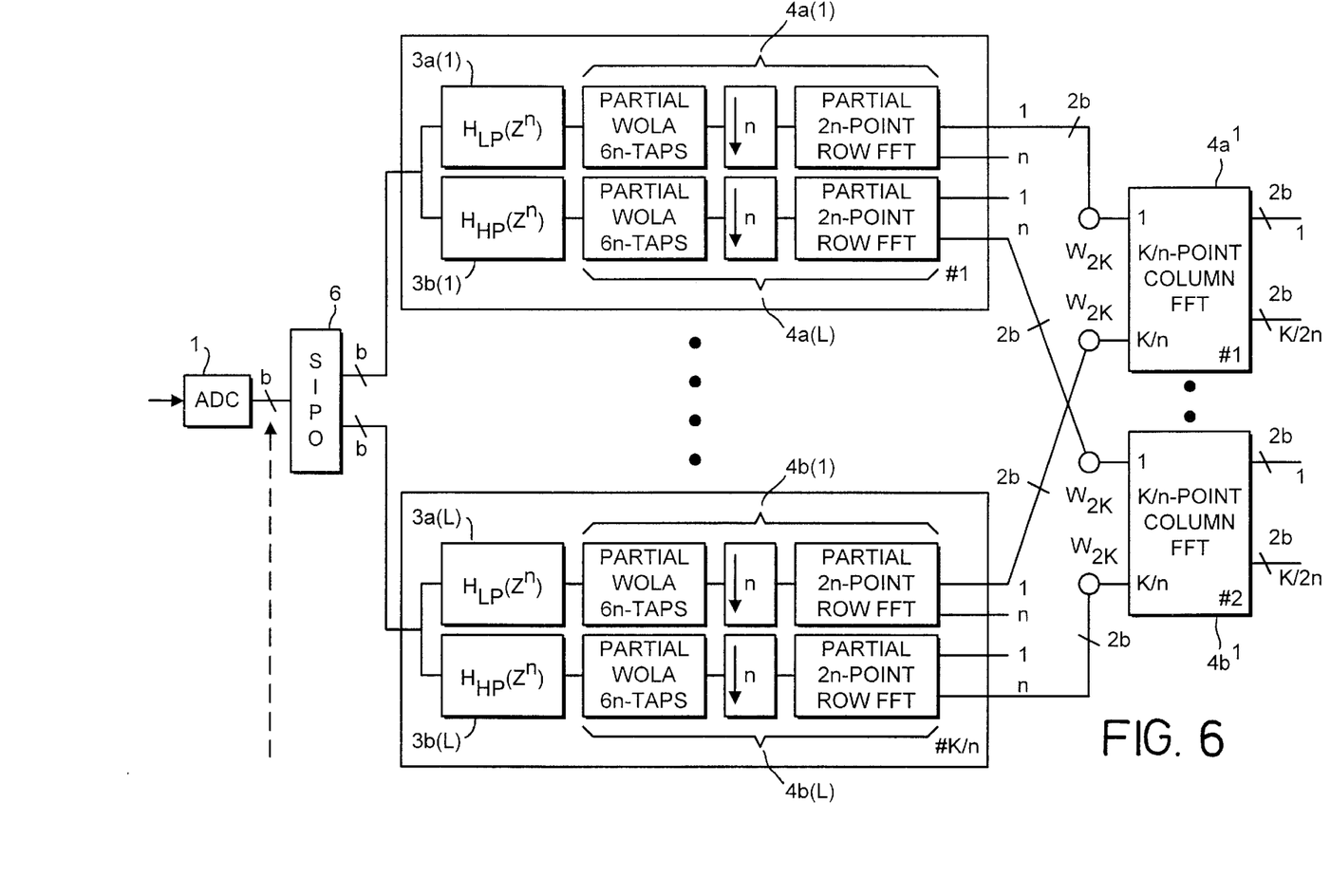
FIG. 6 is a conceptual representation of a second form of digital signal processing apparatus in accordance with the invention for frequency demultiplexing a wideband channel into K sub-bands.

In the second form of digital signal processing apparatus of FIG. 6, converters 7a, 8a, 7b, 8b are omitted, and it has surprisingly been found that 3a(1) can be connected directly to 4a(1), 3b(1) to 4b(1) etc. This will be discussed in more detail below.

In the case of both digital signal processing apparatuses, it is possible to implement the second digital filter using processors in parallel branches by executing the FFTs as partial FFTs in an FFT decomposition. It is possible to implement the first digital filter in parallel branches in both apparatuses for reasons explained.

The parallel implementation of the first form demultiplexer will now be explained in greater detail. The first digital filter 3 of FIG. 2 is a single rate structure with no decimation or interpolation between the input and output sampling rates. The unit sample response of the digital filter 3 is that of a prototype FIR filter (a ½-band design) with an additional L−1 zeros padded between each coefficient, L being the interpolation factor between the sampling rate of the prototype ½-band filter and the sampling rate of the input. With the real input signal being divided into K equal sub-bands L=K.

Figure 11A:
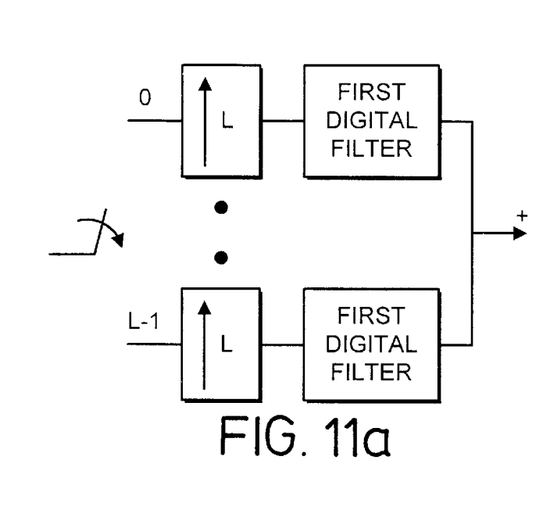
FIGS. 11a to 11c illustrate the features of the digital signal processing apparatus of FIGS. 5.
Figure 11B:
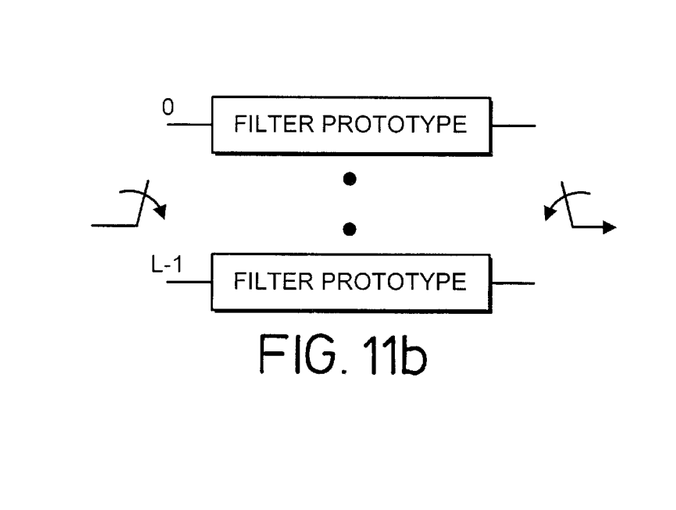
Figure 11C:
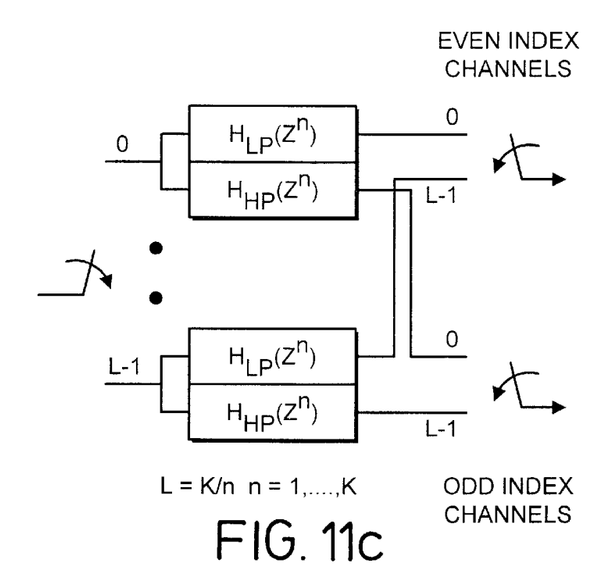

The realisation of the first digital filter 3as parallel low-rate branches in this general case can be understood by considering the polyphase decomposition of the input signal, as shown in FIG. 11a. Each output sample from the first digital filter 3 of FIG. 2 is the sum of L branch computations, L−1 of which are identically zero on any output sample due to the zero-padded nature of the unit sample response. The summation can be replaced with a commutator and the input signal also delivered to each branch with a commutator, as shown in FIG. 11b. The first digital filter can therefore be implemented as a set of up to L parallel low sampling rate branches with input and output commutators as shown in FIG. 11c; in the case where the maximum of L branches are used n=1 and each branch filter is simply a copy of the original ½-band prototype filter.

Each of the two full rate outputs from the first digital filter is processed in a second digital filter. The second digital filter applies a 2K-point FFT on successive windowed, aliased, segments of its input which are prepared by the WOLA filter. The windowed segments could be of length N=6K, overlapped by K samples (the output decimation factor), and aliased by 3 to form the 2K sample segment input to the FFT.

There are L≦K branches in the first digital filter and if the second digital filter is also realised as L independent branch structures then the two sets of branches can be combined as a set of L separate parallel processing chains, as shown in FIG. 4.

The key to the realisation of the second digital filter in this way is to exploit the fact that the 2K-point FFT can be performed as a 2D FFT based on a row-column decomposition of the samples with L rows (processors 4a(1) to 4a(L): 4b(1) to 4b(L)) and (2K/L) columns (processors 4a', 4b'), where the placing of samples into the rows is performed in natural order using a commutator. The WOLA filter function can be realised as L separate branch processes (see FIG. 6) provided that the overall decimation factor in the second digital filter, M, and the number of branches L satisfy the relation:

$$M=nL, \text{ where n is an integer} \geq 1.$$

In the architectures of FIGS. 5 and 6, the second digital filter decimation factor M=K, and the number of branches L≦K, so the above equation is satisfied. The architectures with output decimation by K can therefore be implemented in parallel form with L=K/n branches.

The WOLA filter could have a unit sample response of length $N_{second\ digital\ filter}$=6K, which is applied as a multiplicative windowing function to the signal samples prior to the 2K-point FFT. In the parallel implementation of each second digital filter into L=K/n branches, based on a decomposition of the 2K-point FFT into (K/n) 2n-point row FFTs and 2n (K/n)-point column FFTs, the length of the segment of window in each branch is 6n. The multiplication and aliasing operation in each branch is performed as a set of 2n FIR-type convolutions generating the 2n inputs to the row FFTs.

Only a partial transform is required on each of the two second digital filters, since each produces half the demultiplexed slots (and in turn half of these are not computed since they are complex conjugates). This means that a total of 2n column FFT processors (4a', 4b') are required to complete the demultiplexing of the K channel slots, the column FFT being a (K/n)-point transform. The 2n-point row transforms can also be implemented as partial FFTs because only half of the outputs from any given branch FFT are required.

In general the 2D decomposition uses the Cooley-Tukey algorithm, which requires an intermediate set of twiddles between the 2n-point row FFTs and the (K/n)-point column FFTs. Because each second digital filter performs a partial FFT, only about half the twiddles are required on each.

FIG. 6 shows the generic form of the parallel architecture for the high speed front-end demultiplexer which divides the input FDM into K sub-bands. The ADC 1 delivers a real sample sequence at rate $f_s$ with wordlength b. This is converted to L=K/n parallel streams each at rate $nf_s/K$ which are processed as shown in the branch chains. The branch processors are identical apart from the 6n (in this example) distinct coefficients in each partial WOLA. The branch inputs are real, and the outputs are in general complex. The demultiplexing is completed with the set of 2n complex-complex (K/n)-point column FFTs (4a', 4b'), each of which synthesises K/2n useful outputs.

In the implementation shown in FIG. 6, the twiddles $W_{2K}$ are shown acting on the inputs to the column FFT processors. In practice, implementation considerations would probably dictate that the twiddles are implemented on the branch processors to avoid excessive complexity in the column FFT processor. The input FDM could comprise 8 channel slots on a 42 MHz spacing, in an even stacking configuration. To extract 6 useful slots spanning 252 MHz it is necessary that the passband of the analogue filter providing the input to the ADC 2 spans 7 slots with a bandwidth of 294 MHz; the shape factor of the AAF is therefore 9/7 and the sampling frequency is 672 Msps.

The Tables below show how certain key parameters vary as a unction of K, the number of sub-bands, for two possible architecture options.

| Cooley-Tukey decomposition, n = 1 | | | | | |
|---|---|---|---|---|---|
| parameter | description | K = 8 | K = 16 | K = 32 | K = 64 |
| fs | input sampling rate Msps | 672 | 672 | 672 | 672 |
| L | number of branch chains | 8 | 16 | 32 | 64 |
| fs/L | branch input sampling rate | 84 | 42 | 21 | 10.5 |
| fs/K | branch output sampling rate | 84 | 42 | 21 | 10.5 |
| Kl | column FFT size | 8 | 16 | 32 | 64 |
|  | sub-bands/channel | 1 | 2 | 4 | 8 |

| Cooley-Tukey decomposition, n = 2 | | | | | |
|---|---|---|---|---|---|
| parameter | description | K = 8 | K = 16 | K = 32 | K = 64 |
| fs | input sampling rate Msps | 672 | 672 | 672 | 672 |
| L | number of branch chains | 4 | 8 | 16 | 32 |
| fs/L | branch input sampling rate | 164 | 84 | 42 | 21 |
| fs/K | branch output sampling rate | 84 | 42 | 21 | 10.5 |
| Kl | column FFT size | 4 | 8 | 16 | 32 |
|  | sub-bands/channel | 1 | 2 | 4 | 8 |

Twiddles between the row FFTs and the column FFTs can be eliminated if a Good-Thomas decomposition is used, this however imposes certain constraints on the architecture.

The parameters which characterise a parallel implementation of the architecture are summarised in the Table below.

| parameter | description |
|---|---|
| fs | sampled bandwidth of real input is fs/2 |
| b | ADC sample wordlength |
| K | number of sub-band slots |
| n, m | integers >0 |
| K/n | number of branch chains |
| nfs/K | sampling rate of branch chain input (real) |
| fs/K | sampling rate of branch chain outputs (complex) |
| 2 nm | number of column FFT processors |
| K/nm | size of complex-complex column FFT |

The lowest complexity branch processor option is n=1 and m=1. However there are disadvantages with opting for this minimum complexity branch processor. The number of chains is maximised at L=K which could complicate the layout of the demultiplexer subsystem, and it also implies that the column FFT size is maximised at K.

A better balance between branch and column processor complexity is achieved by taking n=2. This halves the number of processing chains required and also halves the column FFT size to K/2 (although twice as many are required).

There remains the difficulty that with m=1 the only option is to use the Cooley-Tukey decomposition of the FFT, which adds a significant complexity to the branch processors which each have to have a complement of "twiddle" factors.

It is considered that the optimum partitioning is to use a Good-Thomas decomposition with n=2 and m=2. This results in a branch processor of intermediate complexity and the column FFT size is halved again to K/4.

The sample deinterleaver (serial-to-parallel converter) and interleaver (parallel-to-serial converter) functions are relatively simple to implement using flip-flops. The ADC will have 2 output channels, at 8 bits each. Each channel is divided into 7 separate sample streams with 14 flip-flops/bit, giving a total 1–14 deinterleaver. The complete unit therefore requires 224 flip-flops, each drawing 3.05 mW to give a total of 683 mW. Adding I/O the total power for the 1–14 SIPO unit in GaAs would be less than 5 W.

The arrangements of FIGS. 5 and 6 may have a useful bandwidth of 252 MHz, comprising six 36 MHz channels on a 42 MHz channel centre spacing. The Good-Thomas algorithms may be used to provide 23 useful 9 MHz sub-bands spanning 240 MHz which lie in the positive frequency half of the AAF passband. The sub-bands are on a 10.5 MHz spacing and are oversampled by 2 on the output of the demultiplexer at 21 Msps. Note that by going to a finer granularity the shape factor of the AAF and AIF filters can be increased and at the same time the overall sampling rate reduced by more than 10% from 672 Msps to 588 Msps. FIG. 1 shows such an organisation of the channel. Clearly, this is much more flexible than existing analogue arrangements. A user who only needed a small bandwidth, say, 9 MHz, would not be constrained by the analogue implementation, into purchasing the use of far more bandwidth (36 MHz minimum), than required, thereby saving cost.

In either bandwidth organisation, the parallel implementation permits the use of processors in the parallel branches operating at no more than 42 Msps, so that cheaper CMOS processors e.g. on ASICs can be used, whereas if an attempt was made to implement the embodiments in the serial form of FIG. 2, data processing speeds of at least 588 Msps would be required, which would not be practicable to implement in today's technology even if expensive GaAs processors were used.

Multiplexers according to the invention work in an inverse manner to the demultiplexers described with the caveat that in the multiplexer mode the first digital filter is bypassed if the baseband inputs are oversampled by 2.

The processing apparatus is suitable for transparent as well as regenerative satellites.

Of course, variations may be made without departing from the scope of the invention. Thus, while the embodiments of FIGS. 5 and 6 have been described in relation to a wide bandwidth channel, that is wide compared to the 4 MHz typical bandwidth of the prior art FIG. 2 arrangement, the invention is also applicable to such narrow bands, and is even applicable to wider bands than those referred to above, for example, to a band of 588 MHz, or to bandwidths between 4 MHz and 588 MHz. Further, further (de) multiplexing of the kind described in EP-A-0 695 054 may be performed on each sub-band in the above described embodiment.

What is claimed is:

1. Digital signal processing apparatus for frequency demultiplexing a wideband channel into equally spaced sub-bands, comprising a fine filtering stage which includes low pass digital filter means and high pass digital filter means, each being arranged to null out alternate frequency slots leaving only even numbered and odd numbered sub-bands, and a coarse filtering stage connected to the output of the fine filtering stage which includes digital filter means for isolating the even numbered sub-bands and the odd numbered sub-bands, wherein there is provided a serial-to-parallel converter operative to feed cyclically wideband signal samples at an input to outputs connected to a plurality of parallel branches, whereby the branches contain sub-sampled signals, and wherein the low pass filter means and the high pass filter means each comprise a respective filter in each parallel branch.

2. Digital signal processing apparatus as claimed in claim 1, in which there is a half band low pass filter and a half band high pass filter in each parallel branch.

3. Digital signal processing apparatus as claimed in claim 1, in which the respective filters in each parallel branch are finite impulse response (FIR) filters.

4. Digital signal processing apparatus as claimed in claim 1, in which the signals in the parallel branches are combined before the coarse filtering stage.

5. Digital signal processing apparatus as claimed in claim 1, in which the signals in the parallel branches are not combined until after the coarse filtering stage.

6. Digital signal processing apparatus as claimed in claim 1, in which the digital filter means comprises a respective processor associated with the respective low pass and high pass filter in each parallel branch.

7. Digital signal processing apparatus as claimed in claim 6, in which each processor is arranged to perform a partial FFT along a dimension of an N-dimensional array into which the FFT operation is decomposed.

8. Digital signal processing apparatus as claimed in claim 1, wherein each respective filter has a zero-padded impulse response.

9. Digital signal processing apparatus for frequency multiplexing a plurality of sub-bands into a wide band channel comprising a block coarse filtering stage which includes digital filter means for combining even numbered sub-bands, and for combining odd numbered sub-bands, and a fine filtering stage connected to the output of the coarse filtering stage, which fine filtering stage includes low pass digital filter means and high pass digital filter mans, each arranged to null out alternate frequency slots leaving only the even numbered sub-bands and the odd numbered sub-bands, wherein there is provided parallel-to-serial converter operative to combine cyclically subsamples from input connected to a plurality of parallel branches, to produce at an output wideband signal samples, and wherein the low pass filter means and the high pass filter means each comprise a respective filter in each parallel branch.

10. Digital signal processing apparatus as claimed in claim 9, in which there is a half band low pass filter and a half band high pass filter in each parallel branch.

11. Digital signal processing apparatus as claimed in claim 9, in which the respective filters in each parallel branch are finite impulse response (FIR) filters.

12. Digital signal processing apparatus as claimed in claim 9, including a parallel-to-serial converter after the coarse filtering stage.

13. Digital signal processing apparatus as claimed in claim 9, in which the signals corresponding to the sub-bands are not combined until a parallel-to-serial converter after the fine filtering stage.

14. Digital signal processing as claimed in claim 9, in which the digital filter means comprises a respective processor associated with the respective low pass and high pass filter in each parallel branch.

15. Digital signal processing apparatus as claimed in claim 14, in which each processor is arranged to perform a partial FFT along a dimension of an N-dimensional array into which the FFT operation is decomposed.

16. Digital signal processing apparatus as claimed in claim 9, wherein each respective filter has a zero-padded impulse response.

* * * * *